Dec. 4, 1928.
E. F. W. ALEXANDERSON
1,694,244
ELECTRICAL APPARATUS
Filed Aug. 9, 1926
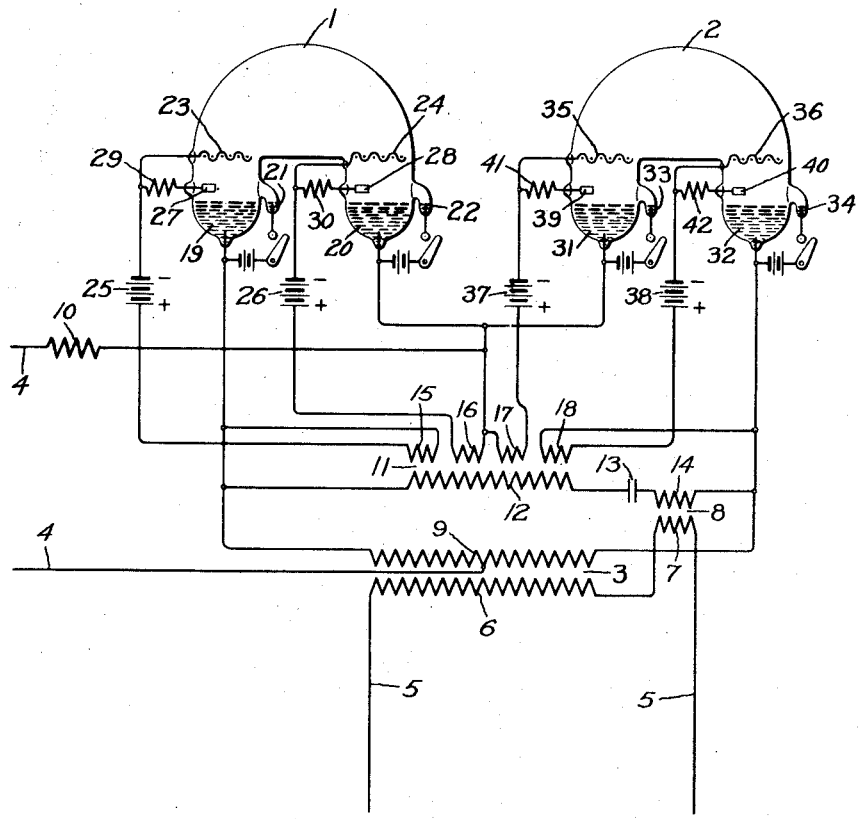
Inventor:
Ernst F. W. Alexanderson;
by
His Attorney.

Patented Dec. 4, 1928.

1,694,244

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRICAL APPARATUS.

Application filed August 9, 1926. Serial No. 128,265.

My invention relates to apparatus for transmitting current between different electrical circuits, and has for its principal object the provision of an improved apparatus which is operable to transmit power between direct and alternating current circuits in a direction dependent on the relation existing between the circuit voltages.

Various arrangements have been proposed in the past for transmitting power between direct and alternating current circuits or systems. Most of these arrangements have the disadvantage that their connections to the direct current circuit must be changed in order to reverse the direction in which they transmit power. In accordance with my invention, this difficulty is avoided by the provision of an improved apparatus for transmitting power between the circuits in a direction dependent on the relation between the circuit voltages.

My invention will be better understood from the following description when considered in connection with the accompanying drawing and its scope will be pointed out in the appended claims.

The drawing illustrates an apparatus wherein my invention has been embodied.

This apparatus comprises a pair of electron discharge or vapor electric devices 1 and 2 and a transformer 3 through which power is transmitted in either direction between a direct current circuit 4 and an alternating current circuit 5. The transformer 3 comprises a winding 6 which is connected to the alternating current circuit 5 through the primary winding 7 of a current transformer 8 and a winding 9 which has its end terminals connected to one side of the direct current circuit 4 through the devices 1 and 2. It will be observed that the winding 9 is connected to the other side of the circuit 4 at a point intermediate its end terminals and that a smoothing reactor 10 is connected in series with the circuit 4.

The grid potentials of the devices 1 and 2 are controlled by a transformer 11 comprising secondary windings 15 to 18 and a primary winding 12 connected to the winding 9 through condenser 13 and the secondary winding of the series transformer.

The device 1 is provided with vaporizable electrodes 19 and 20, with starting electrodes 21 and 22, with grids 23 and 24 which are connected to the electrodes 19 and 20 respectively through a grid bias battery 25 and the secondary circuit 15 and through bias battery 26 and the secondary circuit 16, and with exciting electrodes 27 and 28 which are connected to the electrodes 19 and 20 respectively through smoothing reactor 29, battery 25 and secondary circuit 15 and through smoothing reactor 30, battery 26 and secondary circuit 16.

The device 2 is likewise provided with vaporizable electrodes 31 and 32, with starting electrodes 33 and 34, with grids 35 and 36 which are connected to the electrodes 31 and 32 respectively through bias battery 37 and secondary circuit 17 and through bias battery 38 and secondary circuit 18, and with exciting grids 39 and 40 which are connected to the electrodes 31 and 32 respectively through a reactor 41, battery 37 and the secondary circuit 17 and through a reactor 42, battery 38 and the secondary circuit 18.

It is customary to provide vapor electric devices with a plurality of electrodes which operate as anodes and with only one electrode which normally operates as a cathode. During the operation of such a device, each anode is maintained at a negative potential during an appreciable interval of time and it is a comparatively simple matter to prevent the starting of current to the anode by means of a grid which is charged to a negative potential. The electrodes 19, 20, 31 and 32 of the illustrated apparatus, however, are of such a character that current is readily transmitted between them in either direction. A reversal of current between the electrodes 19 and 20 or between the electrodes 31 and 32 may therefore take place instantaneously and control of the current by the grids 23 and 24, or the grids 35 and 36, is not secured unless the grid potential is negative at the instant the current between the corresponding main electrodes becomes zero. The batteries 25, 26, 37 and 38 are provided for the purpose of ensuring that the grid potential is negative when the current between the main electrodes attains its zero value. Under these conditions, grid control of the current is secured each time the current passes through its zero value and the transmission of current in the wrong direction either between the electrodes 19 and 20 or between the electrodes 31 and 32 is prevented. The batteries 25, 26, 37 and 38 are intended to represent in a general way any suitable means whereby the proper bias potential is applied to the grids of devices 1 and 2.

For satisfactory operation of the apparatus, it is necessary that the current start in one of the vapor electric devices before it stops in the other. This result is produced by the condenser 13 which is connected in series with the primary circuit of the grid transformer 11 and causes the grid potentials of the devices 1 and 2 to lead the anode potentials of these devices. The phase angle by which the grid voltage should lead the anode voltage is dependent on the conditions under which the apparatus is operating. Thus if the apparatus is operating as a derectifier, to transmit power from the circuit 4 to the circuit 5, the grid voltage should lead the anode voltage by a phase angle which increases and decreases with the magnitude of the power supplied from the circuit 4 to the circuit 5. If the apparatus is operating as a rectifier, the grid voltage should lead the anode voltage by a phase angle which should be increased as the load of the direct current circuit 4 increases. In the illustrated form of my invention, this variation in the magnitude of the phase angle between the grid and anode voltage is produced by the series transformer 8 which injects into the grid voltage a component varying in magnitude directly as the current of the alternating current circuit 5.

When the voltage of the alternating current circuit 5 is high as compared with that of the circuit 4, power is transmitted from the circuit 5 to the circuit 4. Thus assuming the left hand terminal of the line 5 to be positive, the grids 23 and 24 are charged to a positive potential, the grids 35 and 36 are charged to a negative potential, and current is transmitted to the circuit 4 through the left hand section of the secondary winding 9, the electrode 19 and the electrode 20. Near the end of the half cycle, however, the positive voltages applied to the grids 23 and 24 through the secondary circuits 15 and 16 become less than the voltages of the bias batteries 25 and 26 and the potentials of grids 23 and 24 become negative before the current between the electrodes 19 and 20 reaches its instantaneous zero value. This change in the grid potential prevents starting of current in the reverse direction between the electrodes 19 and 20.

Due to the condenser 13, leading positive potentials are applied to the grids 35 and 36 of device 2 and the starting of current through the right hand section of the winding 9 and between the main electrodes 31 and 32 at the beginning of the half cycle is permitted. Near the end of the half cycle, however, the voltages of batteries 37 and 38 predominate, the potentials of grids 35 and 36 become negative and reversal of the current between the electrodes 31 and 32 is prevented. The further operation of the apparatus as a rectifier will be apparent. It should be noted that the devices 1 and 2 are continuously excited by current supplied to the exciting electrodes through the secondary circuits of the grid transformer 11, the continuity of the arc between the exciting and main electrodes being ensured by the smoothing reactors 29, 30, 41 and 42.

The operation of the apparatus as a derectifier to transmit power from the circuit 4 to the circuit 5 will be readily understood in view of the previous explanation. During operation of the apparatus as a derectifier, the direction of current transmission through the circuit 4 is reversed and current is transmitted between the electrodes 19 and 20 and between the electrodes 31 and 32 in directions which are opposed to the directions of current transmission when the apparatus is operating as a rectifier. The sequence of operations whereby current is transferred to and fro between the devices 1 and 2, however, is the same as that previously set forth. Under these conditions, the frequency of the power delivered to the line 5 will depend on the capacity or other load characteristics of this line.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new, and desire to secure by Letters Patent of the United States, is:

1. The combination of direct and alternating current circuits, electron discharge means provided with main electrodes connected to transmit power in either direction between said circuits and with grids for controlling the starting of current between said electrodes, and means comprising a current transformer arranged to apply to each of said grids a potential of a phase dependent on the magnitude of the power transmitted between said circuits.

2. The combination of a pair of electrical circuits, vapor electric means provided with main electrodes connected to transmit power between said circuits in a direction dependent on the relation between the voltages of said circuits and with grids arranged to control the starting of current between said main electrodes, and means connected to cause a phase difference to be produced between the potential applied to said main electrodes and the potential applied to said grids.

3. The combination of a pair of electrical circuits, vapor electric means provided with main electrodes connected to transmit power between said circuits in a direction dependent on the relation between the voltages of said circuits and with grids arranged to control the starting of current between said main electrodes, and means connected to produce between the voltages applied to said main anodes and the voltages applied to said grids a phase difference which is dependent on the power interchanged between said circuits.

4. The combination of a pair of electrical circuits, vapor electric means provided with main electrodes connected to transmit power between said circuits in a direction dependent on the relation between the voltages of said circuits and with grids arranged to control the starting of current between said main electrodes, means connected to cause a phase difference to be produced between the potential applied to said main electrodes and the potential applied to said grids, and means operable to vary said phase difference in response to variation in the magnitude of said power.

5. The combination of direct and alternating current circuits, a plurality of devices each provided with a pair of vaporizable electrodes connected between said circuits and with grids for controlling the starting current between said pairs of vaporizable electrodes, and means arranged to control the potentials of said grids in accordance with the magnitude of the power transmitted between said circuits.

In witness whereof, I have hereunto set my hand this 6th day of August, 1926.

ERNST F. W. ALEXANDERSON.